United States Patent
Mech et al.

(10) Patent No.: US 10,062,215 B2
(45) Date of Patent: Aug. 28, 2018

(54) AUTOMATIC GENERATION OF 3D DRAWING OBJECTS BASED ON A 2D DESIGN INPUT

(71) Applicant: Adobe Systems Incorporated, San Jose, CA (US)

(72) Inventors: Radomir Mech, Mountain View, CA (US); Mehmet Ersin Yumer, San Jose, CA (US); Haibin Huang, Hadley, MA (US)

(73) Assignee: Adobe Systems Incorporated, San Jose, CA (US)

( * ) Notice: Subject to any disclaimer, the term of this patent is extended or adjusted under 35 U.S.C. 154(b) by 137 days.

(21) Appl. No.: 15/014,386

(22) Filed: Feb. 3, 2016

(65) Prior Publication Data

US 2017/0221257 A1 Aug. 3, 2017

(51) Int. Cl.
*G06T 19/20* (2011.01)
*G06T 11/00* (2006.01)
*G06T 17/00* (2006.01)

(52) U.S. Cl.
CPC .......... *G06T 19/20* (2013.01); *G06T 11/001* (2013.01); *G06T 17/00* (2013.01); *G06T 2219/2021* (2013.01)

(58) Field of Classification Search
None
See application file for complete search history.

(56) References Cited

U.S. PATENT DOCUMENTS

| | | | | |
|---|---|---|---|---|
| 2003/0222868 A1* | 12/2003 | Raskar | ............... | G06T 17/10 345/419 |
| 2013/0127847 A1* | 5/2013 | Jin | .................. | G06T 17/20 345/420 |
| 2015/0193972 A1* | 7/2015 | Algreatly | .............. | G06T 3/60 345/420 |
| 2016/0225194 A1* | 8/2016 | Kim | ................... | G06T 19/20 |

OTHER PUBLICATIONS

Pu, Jiantao, Kuiyang Lou, and Karthik Ramani. "A 2D sketch-based user interface for 3D CAD model retrieval." Computer-aided design and applications 2.6 (2005): 717-725.*

(Continued)

*Primary Examiner* — Ryan M Gray
(74) *Attorney, Agent, or Firm* — Finch & Maloney PLLC

(57) ABSTRACT

Methods and systems are directed to improving the convenience of drawing applications. Some examples include generating 3D drawing objects using a drawing application and selecting one based on a 2D design (in some cases a hand-drawn sketch) provided by a user. The user provided 2D design is separated into an outline perimeter and interior design, and corresponding vectors are then generated. These vectors are then used with analogous vectors generated for drawing objects. The selection of a drawing object to correspond to the 2D design is based on finding a drawing object having a minimum difference between its vectors and the vectors of the 2D design. The selected drawing object is then used to generate a drawing object configured to receive edits from the user. This reduces the inconvenience required to manually reproduce the 2D design in the drawing application.

26 Claims, 5 Drawing Sheets

(56) References Cited

OTHER PUBLICATIONS

Lei, Haopeng, Yuhua Li, Helian Chen, Shujin Lin, Guifeng Zheng, and Xiaonan Luo. "A novel sketch-based 3D model retrieval method by integrating skeleton graph and contour feature." Journal of Advanced Mechanical Design, Systems, and Manufacturing 9, No. 4 (2015): JAMDSM0049-JAMDSM0049.*

Kara, Levent Burak, and Kenji Shimada. "Construction and Modification of 3D Geometry Using a Sketch-based Interface." SBM. 2006.*

Jiantao, Pu, et al. "3D model retrieval based on 2D slice similarity measurements." 3D Data Processing, Visualization and Transmission, 2004. 3DPVT 2004. Proceedings. 2nd International Symposium on. IEEE, 2004.*

Talton, Jerry O. et al., "Exploratory Modeling with Collaborative Design Spaces", Stanford University, 2009, 10 pages.

Lienhard, S. et al., "Thumbnail Galleries for Procedural Models", Eurographics, 2014, 10 pages, vol. 33, No. 2.

Yumer, M. et al., "Procedural Modeling Using Autoencoder Networks", UIST, Nov. 2015, 10 pages.

* cited by examiner

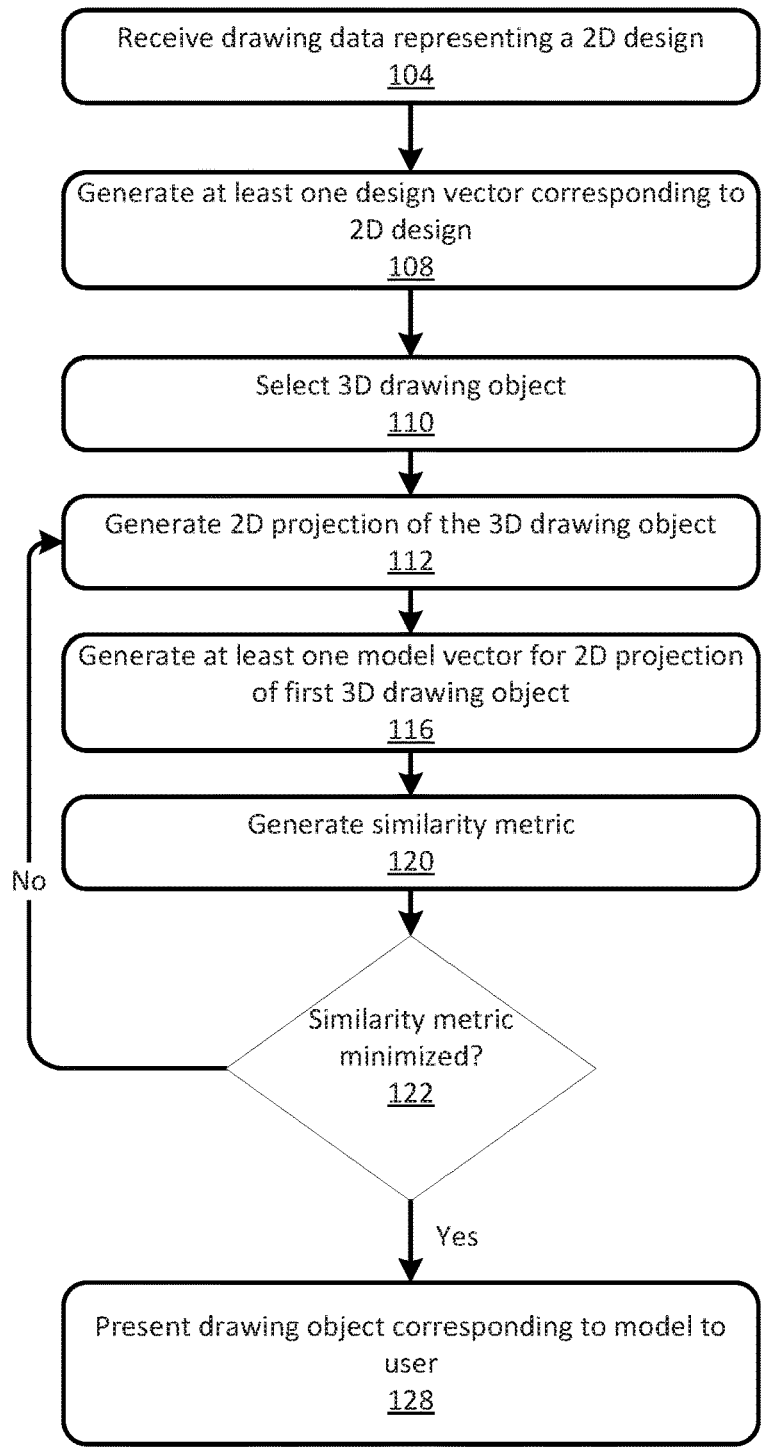

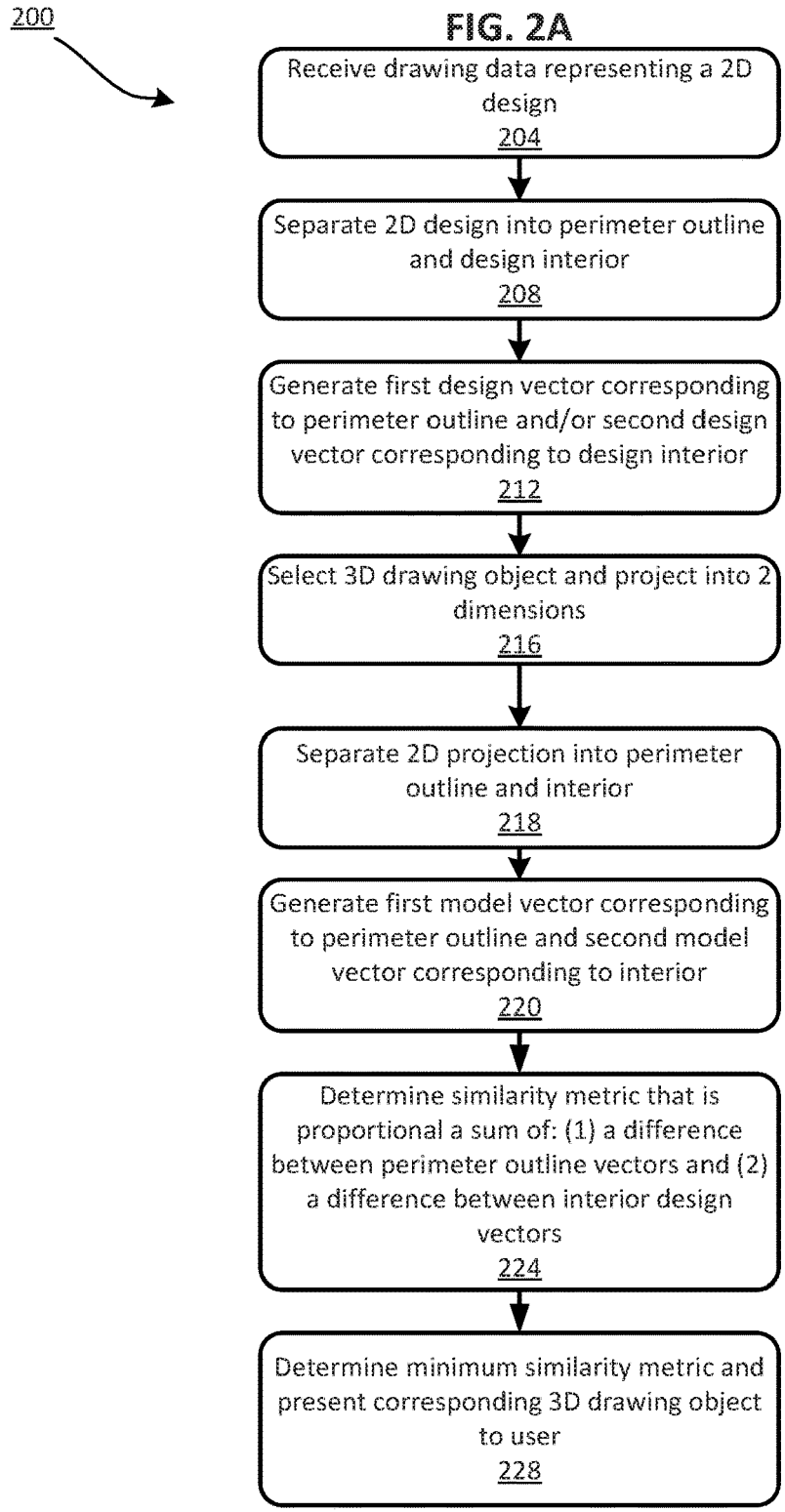

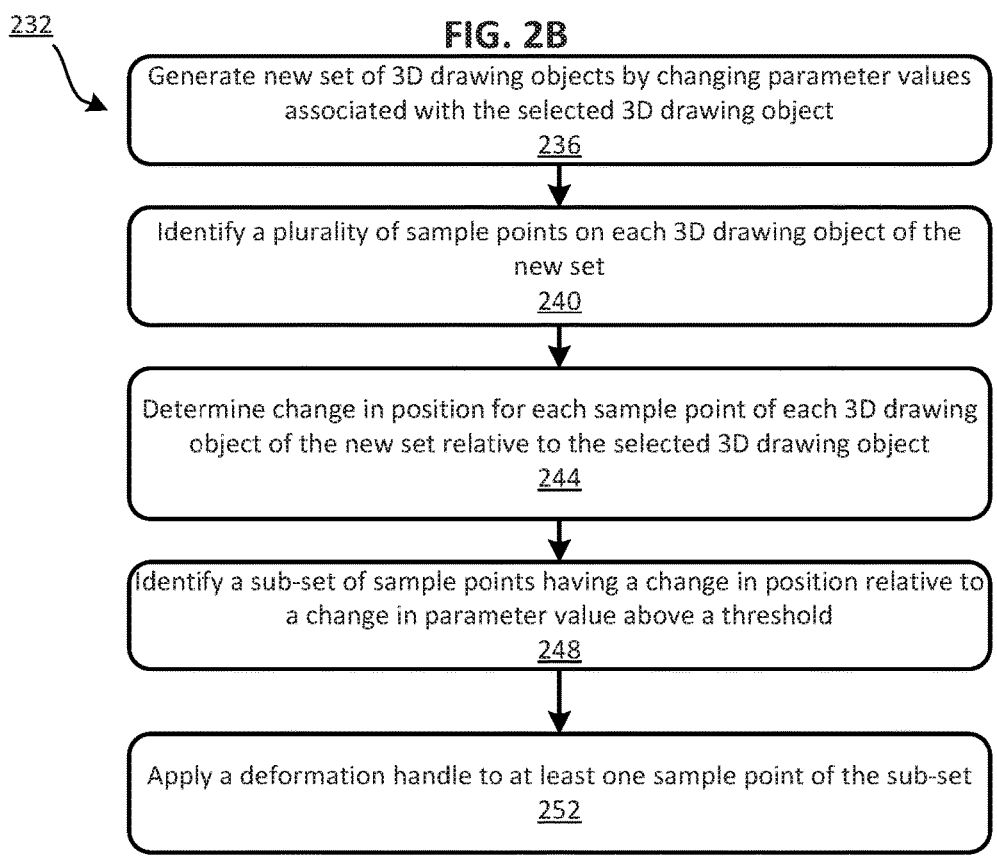

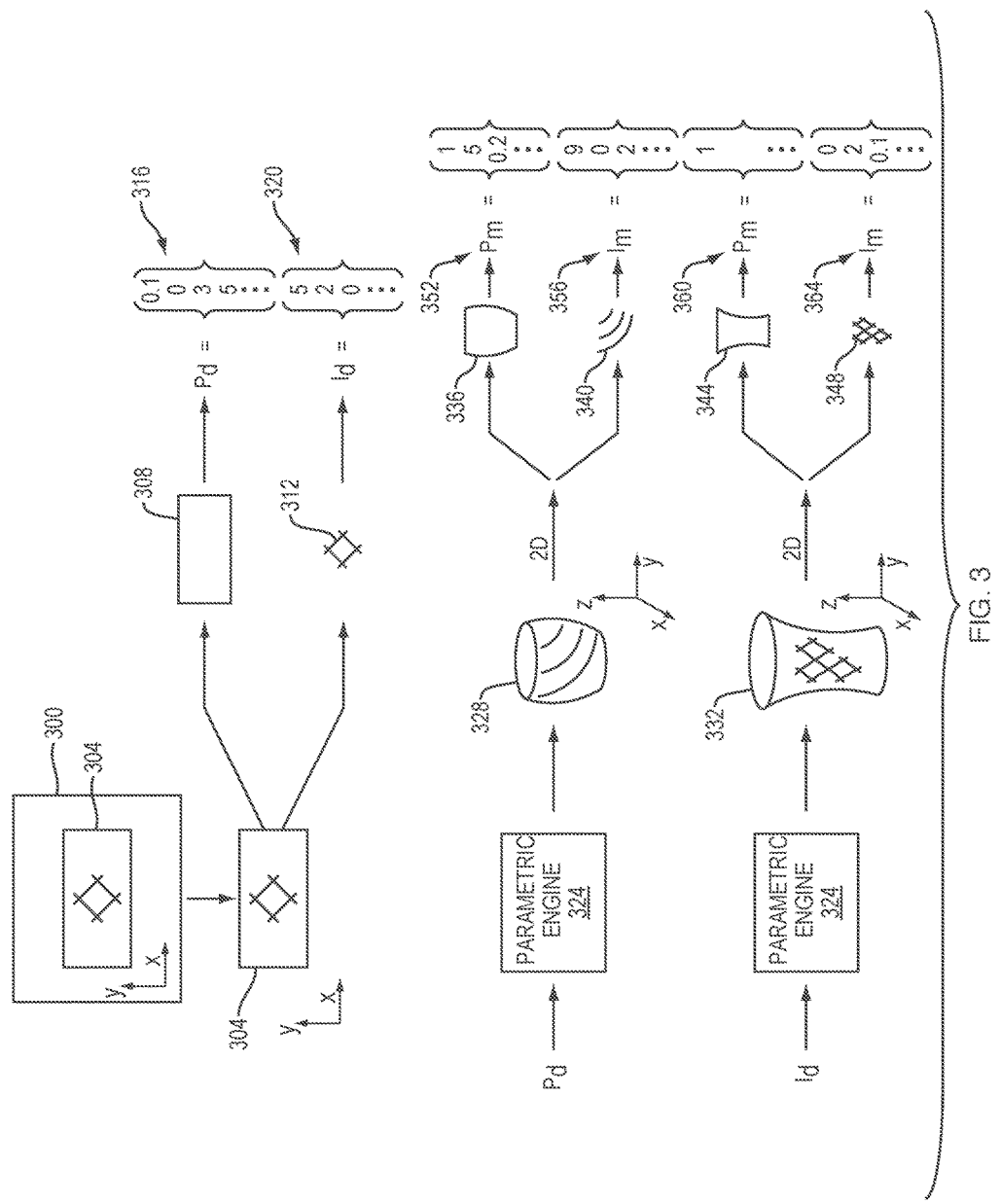

AUTOMATIC GENERATION OF 3D DRAWING OBJECTS BASED ON A 2D DESIGN INPUT

TECHNICAL FIELD

The present disclosure relates generally to generating and editing electronic drawing objects. Specifically, the present disclosure relates to automatically generating three dimensional drawing objects based on drawing data representing a two dimensional design input.

BACKGROUND

Drawing applications provide a variety of tools to users for creating and/or editing electronic drawing objects. In many cases, the drawings, revisions, and edits enabled by the tools in a drawing application could be done by hand only with great difficulty, expense, skill, and time.

However, using a drawing application is not convenient for some types of drawings. For example, in some cases a drawing application will provide too many tools or selectable drawing parameters from which to choose. In some cases, a user may be unable to identify a combination of tools and/or selectable drawing settings to generate a desired effect or image. This type of inconvenience is compounded when a user is attempting to draw or edit an object in a three-dimensional (3D) depiction because the number of possible drawing tool selections and drawing effects is increased. Also, more generally, the technical difficulty of producing a drawing in three dimensions is greater than that of producing a drawing in two dimensions.

BRIEF DESCRIPTION OF THE DRAWINGS

FIG. 1 is a high level flow diagram illustrating an example method for providing a 3D drawing object of a drawing application that is identified using a two dimensional (2D) design provided by a user, in accordance with an embodiment of the present disclosure.

FIG. 2A is a flow diagram illustrating a detailed example method for providing a 3D drawing object of a drawing application based on a 2D design provided by a user wherein the provided 3D drawing object is identified based on a vector comparison between the 2D design and a 2D projection of a 3D drawing object of the drawing application, in accordance with an embodiment of the present disclosure.

FIG. 2B is a flow diagram illustrating an example method for applying deformation handles to 3D drawing objects, in accordance with an embodiment of the present disclosure.

FIG. 3 schematically illustrates the generation of perimeter and interior vectors for a 2D design and a 2D projection of a 3D drawing object of a drawing application, in accordance with an embodiment of the present disclosure.

Figure 4A:
FIG. 4A is block diagram of a distributed processing environment that includes a drawing system remotely coupled to a computing device of a user by a communication network, in accordance with an embodiment of the present disclosure.

The figures depict various embodiments of the present disclosure for purposes of illustration only. Numerous variations, configurations, and other embodiments will be apparent from the following detailed discussion.

DETAILED DESCRIPTION

Disclosed herein are embodiments for automatically generating an editable 3D drawing object within a computer implemented drawing application using a user-provided 2D design, such as a hand-drawn sketch. In some embodiments, the user-provided 2D design is rendered into drawing data, which are then analyzed to generate design vectors. The design vectors of the 2D design are then used to identify or generate the editable 3D drawing object within the computer implemented drawing application, thus improving the functionality and convenience of the drawing application.

Overview

Drawing applications (i.e., computer programs used for drawing images or editing images) provide a variety of tools to users for the creation and manipulation of visual content. To generate a 2D or 3D drawing object (where the object is electronically rendered in a drawing application and configured for receiving edits) within a drawing application, a "parametric procedural engine," a common component of existing drawing applications, is sometimes employed. A parametric procedural engine automates various calculations used to generate drawing objects, including 3D drawing objects. Drawing objects, including 3D drawing objects, can be generated using a parametric procedural engine by receiving values from a user for various parameters presented to the user by the drawing application. The parametric procedural engine then uses the user-selected values in calculations to generate a drawing object. The parametric procedural engine thus spares the user from the inconvenience of manually drawing the drawing object.

However, other than for relatively simple or parametrically well-defined shapes, even using a parametric procedural engine can be cumbersome. Indeed, in some cases the parametric procedural engine may fail to produce a desired 3D drawing object altogether. For example, it may be difficult, time consuming, and ultimately futile for a user to identify even a relatively narrow combination of parameter values needed to produce a desired drawing object. This can be particularly true for situations in which 20 or 30 user-selectable parameters (also referred to as "dimensions") are presented to the user by the drawing application for selection of parameter values. To address this, some drawing applications provide pre-generated and stored drawing objects to a user, rather than providing only a set of parameters for selection by the user. A user is then able to manually manipulate or edit a pre-generated drawing object to adapt it to the user's needs. But this too can produce unsatisfactory results for the user. Pre-generated objects are not necessarily similar to those needed by the user and in most cases still require significant editing or revising by the user. Furthermore, it is difficult to identify a pre-generated drawing object that corresponds to a user-provided design, particularly if the user-provided design is drawn only in two dimensions and the pre-generated object is in three dimensions. This is because it can be difficult for a user to visualize an accurate projection of a 3D object into two dimensions (and vice versa). It would be helpful to provide tools in a drawing application that would be able to receive drawing data from users and automatically identify or generate a 3D drawing object similar to the received user drawing data.

Thus, techniques are disclosed herein for automatically generating, for example, an editable 3D drawing object within a drawing application using a user-provided 2D design. The term "2D design" generically refers to any two dimensional image that is provided by the user. Examples of user-provided 2D designs include any two dimensional sketch or drawing (e.g., an image hand-drawn by a user using physical media, an image hand-drawn by a user using electronic media), or other image (e.g., a digital or physical reproduction of a drawing). In one implementation, drawing data of a 2D design is received from a user. "Drawing data" refers to data corresponding to a digital version of the 2D design, such as the data stored in a data file of the digital version of the 2D design.

Based on the received drawing data of the 2D design, design vectors are generated to represent the 2D design. Design vectors are numeric representations of various aspects of the 2D design, including, but not limited to line weight, line curvature, line direction and orientation, line/area texture, area shape, line/area color, and shading, among others. In some examples, the 2D design is separated into one design vector representing a perimeter outline of the 2D design and one design vector representing an interior of the 2D design. The term perimeter outline refers to an outermost line or shape defining boundaries of the 2D design. The term interior refers to lines, drawing objects, patterns, details, and other aspects of a drawing object disposed within the perimeter outline.

As a starting point to a method for providing a three dimensional (3D) drawing object within the drawing application that can be used to represent in three dimensions the received 2D design, a first three dimensional (3D) drawing object is generated (or identified from a library) within the drawing application. The first 3D drawing object can be selected at random or generated according to any algorithm because, as will be explained below in more detail, subsequent 3D drawing objects are selected by successively minimizing differences between the received 2D design and subsequent 3D drawing objects through determination of a "similarity metric." This analysis of minimizing the similarity metric of successive 3D drawing objects makes the selection of the starting point more flexible because the ultimate selection of a 3D drawing object that corresponds to the 2D design received from the user is not dependent on the starting point selection.

Each 3D drawing object selected for analysis is first projected into two dimensions so that it can be compared to the received 2D design in the same dimensionality as the 2D design. For the 2D projection of each 3D drawing object, "model" vectors (so named for convenient distinction from the "design" vectors of the received 2D design) are generated. As with the 2D design, in some embodiments the 3D drawing object projected into two dimensions can be separated into a perimeter outline and an interior. And as with the 2D design, one type of model vector numerically represents a perimeter outline of a 2D projection of a 3D drawing object. Another type of model vector numerically represents an interior of the 3D drawing object.

A model vector of the 3D drawing object that has been projected into 2D is used with a design vector of the received 2D design to generate a similarity metric. A similarity metric quantifies a difference between analogous design vectors of the 2D design and the model vectors of the 3D drawing object that has been projected into two dimensions.

This process is repeated with successive 3D drawing objects, with each successive 3D drawing object being more similar to the received 2D design using a process of minimizing the similarity metric that is described below in more detail. Ultimately, one of the 3D drawing objects is selected as corresponding to the received 2D design based on a lowest (i.e., minimum) value of the similarity metric when compared to the received 2D design. In this way, a 3D drawing object having a perimeter and/or an interior most similar to the received design is determined. The selected 3D drawing object is then presented to the user to receive edits.

In other embodiments, the techniques may also be implemented as a computing system or a cloud-based service operating in a client-server architecture. In still other embodiments, the techniques may be implemented as a computer program product encoded with instructions that can be executed by one or more processors. Numerous variations will be apparent in light of this disclosure.

As used herein, drawing application refers to a computer program product instantiated in non-transitory computer readable media that, when executed by a processor, performs instructions used for the drawing of drawing objects or the editing of drawing objects. Examples of drawing applications include CORELDRAW®, ADOBE® ILLUSTRATOR®, AUTODESK® 3D Studio Max, and AUTODESK® MAYA®, among others. As mentioned above, the term 2D design refers to an image in an electronic or non-electronic medium that is manually drawn by a user. As mentioned above, a drawing object is electronically rendered in a drawing application and is configured for receiving edits within the drawing application. As mentioned above, vectors are numerical representations of aspects of a received 2D design and a 2D projection of a 3D drawing object. Vectors can represent some or all of a perimeter outline or an interior of the 2D design and the 2D projection of the 3D drawing object. Examples of aspects represented have been mentioned above and include orientation, length, and other aspects of lines, shapes, and surfaces such as color, texture, width, shading, among others.

One benefit of some embodiments of the present disclosure is using a hand-drawn user sketch, particularly a sketch drawn using non-electronic media, to identify an electronically editable drawing object. This improves the convenience of drawing applications by enabling users to translate hand-drawn images into an electronic drawing object in a drawing application for further editing without duplicating the initial effort of the hand-drawn sketch. Another benefit of some embodiments of the present disclosure is improving the ease with which a 2D object is transformed into an editable 3D drawing object within a drawing application. As indicated above, it can be time consuming and ultimately futile for a user to manually draw a 2D sketch into three dimensions in a drawing application. Some of the embodiments of the present disclosure reduce the time and effort to perform this two-to-three dimensional conversion. Another benefit of some embodiments of the present disclosure is the improved ease of editing a drawing object within a drawing application upon automatic assignment of deformation handles with which to change a shape of the drawing object. Another benefit of some embodiments of the present disclosure is the ability to identify a repeating pattern present in only a portion of a hand-drawn sketch, and automatically reproduce the repeating pattern within an interior of an electronically editable drawing object that has been selected. This reduces the amount of repetitive effort required of a user to expand a repeating pattern throughout a design.

Example Method

The example method 100 depicted in the flow diagram of FIG. 1 begins by receiving 104 drawing data representing a 2D design from a user. In some embodiments, the drawing data representing the 2D design is data of a digitized version of a hand-drawn sketch that is stored in a data file. Examples of hand-drawn sketches include pencil drawings, charcoal drawings, ink drawings, or other types of physical media drawings on paper. These examples can be digitized using scanning or image capture techniques. In other embodiments, the drawing data representing the 2D design is from an electronic drawing object within a drawing application. Regardless of the technology used to create the drawing data of the 2D design, examples described herein facilitate further editing of the 2D design using an electronic representation of the 2D design within a drawing application.

In some embodiments, the 2D design includes one or both of (1) a perimeter outline that defines the outer shape of the design, and (2) a design interior, both of which are explained above. In some embodiments, the design interior can include one or more of blank portions, portions of a non-repeating pattern, and portions of a repeating pattern. In cases in which only a portion of the interior of the 2D design is occupied by a repeating pattern, used by the author of the 2D design as an abbreviation to symbolize a more extensive repeating pattern, some embodiments of the present disclosure can identify the pattern to be repeated. One example method for identifying and reproducing a repeating pattern is to first identify the various elements (such as lines and curves) within an interior of a 2D design using techniques applied in graph theory for modeling relationships between objects. Once identified, each pair of elements are analyzed to determine a transformation (e.g., a translation, a rotation, a reflection, a change in curvature or slope) that causes a first element of a pair to be superimposed over a second element of the pair. The transformation is described using a coordinate with a number of dimensions that describe the transformation: for example, a coordinate using two dimensions can describe a translation in a plane whereas a coordinate using three dimensions can describe a translation in a plane plus a rotation. The magnitude of the dimensions in the coordinate reflects the amount of transformation needed to superimpose the first element of a pair over a second element of the pair. For example, larger values in a two dimensional coordinate indicate a larger translation than would smaller values. The coordinates are stored and then compared by, for example, grouping all of the various coordinates together. The largest group(s) (i.e., those with the largest number of transformation coordinates) are associated with repeating pattern(s). Once identified, the pattern(s) can be optionally replicated throughout the interior of the corresponding 2D design by replicating the identified element and its associated transformation, thus improving the convenience of the drawing application.

Once the 2D design is received 104, at least one design vector is generated 108 according to the 2D design. In some embodiments, one type of generated design vector corresponds to a perimeter outline and one type of generated design vector corresponds to a design interior. One or more design vectors of each type can be generated in some embodiments. For example, different interior design vectors corresponding to different interior features (e.g., one interior design vector corresponding to a repeating pattern and one interior design vector corresponding to non-repeating features) can be generated. Generating 108 design vector(s) associated with the 2D design is accomplished using methods for converting the various features of the 2D design into an n dimensional feature vector, in which n is a number of dimensions determined by the drawing application that receives the 2D design. Any of a variety of feature extraction algorithms can be used to generate 108 the at least one design vector.

Once the drawing data representing the 2D design is received 104 and the design vector(s) are generated 108, the method 100 turns to analyzing 3D drawing objects that can be used to model the 2D design. The analysis begins by selecting 110 a 3D drawing object for analysis. This selection 110 can be performed by a user, can rely on selection criteria (such as those provided by a user to select a 3D drawing object) which are then used to generate a 3D drawing object, or be random. Regardless of the criteria used, the selected 110 first 3D drawing object can be stored in a library or be generated by a parametric procedural engine. As described above, parametric procedural engines automate various calculations used to generate 3D drawing objects. Parametric procedural engines can generate vast numbers of 3D drawing objects as a function of parameters (i.e., dimensions) and the range of values for each parameter for which the engines are configured to support. In some examples, the number of parameters supported by a parametric procedural engine can be as high as approximately 50. Because of the vast number of possible of drawing objects that can be generated by a parametric procedural engine of a drawing application, the method 100 is configured to accommodate, in some embodiments, a randomly selected 110 first 3D drawing object. However, in other embodiments, a user may have the option of directly selecting a first 3D drawing object from a library or providing parameter values to the parametric procedural engine for the generation of a selected 110 first 3D drawing object. Because embodiments of the present disclosure identify and ultimately select a 3D drawing object based on a process of minimizing a difference between vectors of the 2D design and a 2D projection of successive 3D drawing, selecting a first 3D drawing object is not determinative of an outcome of the method 100.

A 2D projection of the first 3D drawing object is then generated 112. Generating 112 a 2D projection of a 3D drawing object can be performed using a projection matrix, 4×4 transformation matrix, or other type of transformation matrix used to manipulate images between two dimensional space and three dimensional space by converting coordinates of a 3D drawing object into coordinates of a 2D image.

At least one model vector is generated 116 of the 2D projection of the first 3D drawing object. As in the case of the at least one design vector, the at least one model vector can be separated into a first model vector corresponding to a perimeter outline of a 2D projection of a 3D drawing object and a second model vector corresponding to the interior of a 2D projection of a 3D drawing object. As described above in the case of the generated 108 design vectors, the at least one model vectors are generated 116 using any of a variety of feature extraction algorithms identifying features and for generating feature vectors of the features.

A similarity metric 120 is generated according to criteria described in more detail below in the context of FIG. 2A. The similarity metric 120 quantifies a difference between corresponding vectors of the received 2D design and the 2D projection of the 3D drawing object. That is, the similarity metric quantifies a difference between at least one of perimeter outline vectors of the received 2D design and the 2D projection of the 3D drawing object and the interior vectors of the received 2D design and the 2D projection of the 3D drawing object. By identifying 122 a minimum value of the generated 120 similarity metric by iteratively generating 120 similarity metrics between the received 2D design and increasing similar 2D projections of 3D drawing objects, a 3D drawing object having the least difference between its corresponding vectors and the vectors of the 2D design is identified. In one example, the minimum value is determined empirically by iteratively determining a plurality of similarity metrics and identifying the lowest value of the plurality. In another example, the minimum value of the similarity metric is determined by comparing a plurality of determined similarity metrics to a threshold and selecting one that is the lowest relative to the threshold. The similarity metric and its determination are described below in more detail in the context of FIG. 2A.

If the minimum value of the similarity metric has not been identified 122, then the process repeats by selecting a 3D drawing object 110 having a 2D projection of a 3D drawing object that is more similar to the 2D design than the first 3D drawing object used in the analysis by, for example, using a similarity metric below the threshold described above. However, if the minimum value of the similarity metric has been identified 122, then a 3D drawing object corresponding to the 2D projection that was used to determine the minimum value of the similarity metric is presented 128 to the user. The drawing object may then receive edits or modifications from the user.

In some examples, the user may reject the presented 128 3D drawing object, and indicate that the rejected 3D drawing object be used as a starting point for another iteration of the above-described process. For example, using the selected 3D drawing object as a starting point, additional 3D drawing objects can be generated having vectors proximate to the vectors of the selected drawing object. Similarity metrics are then generated and a subsequent 3D drawing object selected based on a minimum value of the various similarity metrics calculated. This subsequent iteration can be repeated any number of times to permit a user to successively probe the vector space of the drawing application by identifying successive 3D drawing objects that are closer and closer to the user provided 2D design.

FIG. 2A illustrates a more detailed method 200 that complements the high level method 100 shown in FIG. 1. As in method 100, drawing data corresponding to a 2D design is received 204. The 2D design is then separated 208 into a perimeter outline and a design interior. This separation can be performed using techniques developed for the field of graph theory, which models relationships between connected objects (such as lines or curves connected at a node). For example, elements (such as lines or curves) of the 2D design are detected and the outermost elements on all sides of the 2D design are identified. These outermost elements are then identified as the perimeter outline, with all remaining elements identified as the design interior. Once the elements corresponding to the perimeter outline and design interior are identified, they can be separated.

As indicated above, the perimeter outline refers to an outermost line or shape defining boundaries of the 2D design and the interior refers to lines, drawing objects, patterns, details, and other aspects of a drawing object disposed within the perimeter outline. In this example, a design vector is generated 212 for at least one of the perimeter outline and the design interior as described above. That is, analogous to element 108 in the method 100, at least one of a first design vector and a second design vector is generated 212. One of the design vectors corresponds to the design interior and one design vector corresponds to the design perimeter outline.

A 3D drawing object is selected 216. In some embodiments, the selected 3D drawing object is generated using a parametric procedural engine of a drawing application, as described above. In other embodiments, the 3D drawing objects are selected from a library of pre-generated drawing objects. Once selected, the 3D drawing object is projected 216 into two dimensions. This projection of a 3D drawing object into two dimensions enables a direct comparison of the projected drawing object to the 2D design in the same dimensional space. The 2D projections of the 3D drawing object is then separated 218 into a perimeter outline and an interior, analogous to processes described above. At least one of a first model vector and a second model vector are generated 220 for each of the perimeter outline and the interior of the 2D projection of the 3D drawing object.

As indicated above, ultimately the output of both of methods 100 and 200 is a 3D drawing object that is similar to the 2D design provided by the user. In some embodiments, the identification of this drawing object is based on determining 224 a similarity metric that is proportional to a minimized a sum of (1) a first difference between a first design vector corresponding to a perimeter outline and a first model vector corresponding to a perimeter outline of a 2D projection of a 3D drawing object and (2) a second difference between a second design vector corresponding to a design interior and a second model vector corresponding to an interior of the 2D projection of the 3D drawing object. The relationship to be minimized in expressed mathematically below in equation 1.

$$M = \text{Min}[\lambda_1 \| P_d - P_m \|^2 + \lambda_2 \| I_d - I_m \|^2] \qquad \text{Equation 1}$$

In equation 1, M is a similarity metric quantifying a difference in perimeter outline and interior design between a user provided 2D design and a 2D projection of a 3D drawing object of a drawing application. "Min" is a minimization function that calculates equation 1 for one or more 2D projections of 3D drawing objects to determine a minimum value (i.e., a smallest difference between the user provided 2D design and the one or more evaluated 2D projections of 3D drawing objects of the drawing application). $P_d$ is a vector corresponding to a perimeter of the 2D design, $P_m$ is a vector corresponding to a perimeter of a 2D projection of a 3D drawing object, $I_d$ is a vector corresponding to an interior design of the 2D design and $I_m$ is a vector corresponding to an interior design of the 2D projection of the 3D drawing object. $\lambda_1$ and $\lambda_2$ each correspond to a selectable weight for each of the different terms. That is, $\lambda_1$ provides a selectable weight applied to a difference between perimeter outlines of a 2D design and a 2D projection of a 3D drawing object, and $\lambda_2$ provides a selectable weight applied to a difference between interiors of a 2D design and a 2D projection of a 3D drawing object.

An advantage of the independently selectable weights of each term is that a user can determine whether a 2D projection of a 3D drawing object should more closely match a perimeter outline of a 2D design or an interior of the 2D design. For example, a 2D design provided by a user may have an intricate design in an interior that, despite its intricacy, is not essential to the 2D design as a whole. For example, a user may select values of $\lambda_1$ and $\lambda_2$ that gives more weight to minimizing the difference between perimeter outlines of the 2D design and a 2D projection of a 3D drawing object so that embodiments of the present disclosure preferentially identify a 2D projection of a 3D drawing object with perimeter outlines similar to the 2D design.

Another advantage of the independently selectable weights is that the similarity metric M can be defined using only one of the two arguments in equation 1. That is, the similarity metric M is, in some embodiments, reduced to one or other of similarity metric $M_1$ or $M_2$, presented below in equations 2 and 3, respectively, by setting one of the independently selectable weights to zero. In equations 2 and 3, the similarity metric is associated with either (1) a similarity between an interior of the 2D design and an interior of a 2D projection of a 3D drawing object or (2) a similarity between a perimeter outline of the 2D design and a perimeter outline of a 2D projection of a 3D drawing object.

$$M_1 = \text{Min} \|P_d - P_m\|^2 \qquad \text{Equation 2}$$

$$M_2 = \text{Min} \|I_d - I_m\|^2 \qquad \text{Equation 3}$$

Using the metric M enables a convenient numeric comparison of a 2D design and one or more 3D drawing objects of a drawing application. The metric M also enables a user to select whether drawing objects of the drawing application should be preferentially selected based on a similarity to a 2D design in a perimeter outline or an interior.

Once one or more minimum values of M are determined 228, as described above, the 3D drawing objects corresponding to the 2D projection having a minimum similarity metric is presented 228 to a user. The presented drawing object may then be edited (e.g., a perimeter outline and/or interior changed) by the user. Optionally, at least one iteration of M may be calculated using the presented and subsequently edited drawing object. In this case, the edited drawing object is used in place of the design. This iterative capability enables a user to receive additional, and in some cases more precise, drawing objects in response to user-initiated edits made to a previously provided drawing object.

While the embodiments described above include method in which 3D drawing objects are selected and analyzed one at a time, it will be appreciated that these embodiments were selected for convenience and clarity of description. In other embodiments, multiple 3D drawing objects can be analyzed in parallel to increase a sampling size of 3D drawing objects for a provided 2D design per unit of computation time. An example embodiment in which more than one 3D drawing object is analyzed at a time is described below in the context of FIG. 3. Furthermore, in other embodiments, 3D drawing objects can be selected for analysis by first generating a first set of 3D drawing objects sampling a range of parameter values that are either randomly selected or are selected based on the provided 2D design. Once the corresponding 3D drawing objects are rendered based on the sample range of parameter values and projected into two dimensions, a gradient between each of the projections and the received 2D design can be determined. Those models with the lowest gradient are then selected for the analysis described above in the context of Equations 1, 2, and/or 3. This selection process can improve the computational efficiency of embodiments of the present disclosure.

Furthermore, while the embodiments described above are in the context of providing a 3D drawing object to a user, these embodiments can be adapted and applied to the providing of a 2D drawing object to user. Rather than first selecting a 3D drawing object and projecting it into two dimensions as presented above, a 2D drawing object is simply selected. Model vectors are then generated for the 2D drawing object and used to generate a similarity metric, as described above.

In some embodiments, deformation handles can be applied to one or more locations of the 3D drawing object that is provided to the user. An example method 232 for applying deformation handles is shown in FIG. 2B. These deformation handles are provided to improve the convenience of editing or changing the 3D drawing object. In one example, locations for deformation handles on the 3D drawing object provided to the user are identified by first generating 236 a new set of 3D drawing objects based on parameters associated with the 3D drawing object already provided to the user. Each 3D drawing object of the new set is generated 232 (using a parametric procedural engine) by applying a change (either additive or subtractive) to parameter values associated with the 3D drawing object provided to the user. Each of the 3D drawing objects in the new set is rendered. A set of sample points is identified 240 on each of these 3D drawing objects in the new set, whether randomly or systematically by, for example, preferentially identifying sample points around a perimeter outline, a design interior, or around a change in slope of a line or curve. A change in position of each sample point is determined 244 by comparing each 3D drawing object in the new set with the 3D drawing object provided to the user, by for example using a point-to-point regression analysis. Based on this information, the change in position of each point relative to change in value of a parameter is determined 244. In some examples, a sub-set of the points having the largest change in position relative to a change in value of a parameter are identified 248 to receive a deformation handle. In some embodiments, the 3 or 5 locations with the largest change in position relative to a change in value of a parameter are identified. In other embodiments, a user is provided a choice from among any number of locations identified using the above process at which to place a deformation handle. Regardless, a deformation handle is then applied 252 to at least one sample point of the sub-set.

Example Embodiment

FIG. 3 schematically illustrates the generation of perimeter vectors and interior vectors for both of a 2D design and 2D projection of a 3D drawing object of a drawing application, in an embodiment of the present disclosure. In this illustration, a hand-drawn sketch 300 with a 2D design 304 is provided. The x-y coordinate axes are shown as an indicator of the 2D nature of the design 304. As described above in the contexts of both FIGS. 1 and 2, the 2D design 304 is separated into a perimeter outline 308 and a design interior 312. A vector $P_d$ 316 is generated corresponding to the outline perimeter of the 2D design and a vector $I_d$ 320 is generated corresponding to the design interior of the 2D design.

Each of these vectors $P_d$ and $I_d$ are processed by the parametric procedural engine 324 of the drawing application to generate 3D drawing objects 328 (one of which is shown for illustration) more closely resembling a perimeter outline 308 of the user provided 2D design and to generate other 3D drawing objects 332 (one of which is shown for illustration) more closely resembling the interior design 312 of the user provided 2D design. The identified 3D drawing objects in this example are identified as 3D by the x-y-z coordinate axes associated with the displayed 3D drawing objects 328 and 332.

As described above, the 3D drawing objects are projected into two dimensions and separated into perimeter outlines and interiors. In the example shown in FIG. 3, the 3D drawing object 328 is separated into perimeter outline 336 and interior design 340. The 3D drawing object 332 is separated into perimeter outline 344 and interior design 348. Each of the perimeter outlines 336 and 344 and each of the interiors 340 and 348 are then used to generate a corresponding vector. For the drawing object 328, vectors $P_m$ 352 and $I_m$ 356 are generated. For the drawing object 332, vectors $P_m$ 360 and 364 are generated. These vectors are then used in Equation 1 along with vectors $P_d$ 316 and $I_d$ 320 to determine a minimized similarity metric (and thus identify a 3D drawing object to present to a user), as described above in the context of FIGS. 1 and 2.

Example System

FIG. 4A is block diagram of a distributed processing environment 400 that includes a drawing system remotely coupled to a computing device of a user by a communication network, in accordance with an embodiment of the present disclosure. The distributed processing environment 400 shown in FIG. 4A includes a user device 404, a network 408, and a drawing system 412. In other embodiments, the system environment 400 includes different and/or additional components than those shown in FIG. 4A.

The user device 404 is a computing device capable of receiving user input as well as transmitting and/or receiving data via the network 408. In one embodiment, the user device 404 is a conventional computer system, such as a desktop or laptop computer. In another embodiment, the user device 404 may be a device having computer functionality, such as a personal digital assistant (PDA), mobile telephone, tablet computer, smartphone or similar device. In some embodiments, the user device 404 is a mobile computing device used for drawing a user provided 2D design or digitizing (e.g., via a scanner or image capture device) a user provided 2D design drawn on, for example, paper with ink or pencil. The user device 404 is configured to communicate with the drawing system 412 via the network 408. In one embodiment, the user device 404 executes an application allowing a user of the user device 404 to interact with the drawing system 412, thus becoming a specialized computing machine. For example, the user device 404 executes a browser application to enable interaction between the user device 404 and the drawing system 412 via the network 408. In another embodiment, a user device 404 interacts with the drawing system 412 through an application programming interface (API) that runs on the native operating system of the user device 404, such as IOS® or ANDROID™.

The user device 404 is configured to communicate via the network 408, which may comprise any combination of local area and/or wide area networks, using both wired and wireless communication systems. In one embodiment, the network 408 uses standard communications technologies and/or protocols. Thus, the network 408 may include links using technologies such as Ethernet, 802.11, worldwide interoperability for microwave access (WiMAX), 3G, 4G, CDMA, digital subscriber line (DSL), etc. Similarly, the networking protocols used on the network 408 may include multiprotocol label switching (MPLS), transmission control protocol/Internet protocol (TCP/IP), user datagram protocol (UDP), hypertext transport protocol (HTTP), simple mail transfer protocol (SMTP) and file transfer protocol (FTP). Data exchanged over the network 408 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

The drawing system 412, described below in the context of FIG. 4B in more detail, comprises one or more computing devices that store the elements of a drawing application and tools for the execution of some or all of the methods presented above in the context of FIGS. 1 and 2.

Figure 4B:
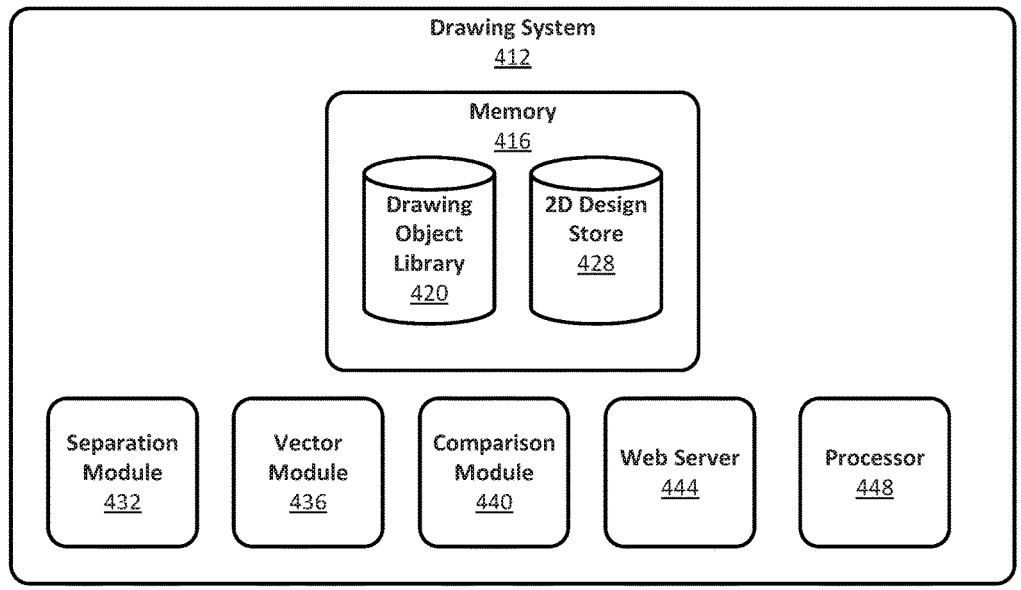
FIG. 4B is a block diagram of a drawing system configured to identify a 3D drawing object of a drawing application based on a user-provided 2D design, in accordance with an embodiment of the present disclosure.

FIG. 4B is a block diagram of a system architecture of the drawing system 412 as shown in FIG. 4A. The drawing system 412 includes memory 416, a separation module 432, a vector module 436, a comparison module 440, a web server 444, and a processor 448.

The memory 416 is depicted as including two distinct elements: a drawing object library 420 and a 2D design store 428. Each of these elements of the memory 416 stores instructions and data in a non-transitory computer readable medium (which may include any suitable optical or magnetic durable storage device, e.g., RAM, ROM, Flash, USB drive, or other semiconductor-based storage medium, a hard-drive, CD-ROM) that, when executed by one or more processors (e.g., processor 448), provides tools and operations associated with a drawing application, including some of the embodiments described above.

The drawing object library 420 is configured for storing, for example, the parametric procedural engine that generates 3D drawing objects based on randomly selected parameter values, user provided values, or default values. The drawing object library 420 also configured to store, in some embodiments, some commonly referenced and/or used 3D drawing objects that are used to generate and/or store a library of drawing objects presented to a user. These can include basic shapes, such as spheres, circles, cubes, squares, various straight and curved lines, and other objects provided with the drawing application for the convenience of users. The drawing object library 420 also includes tools used to edit drawing objects. These tools can include various parameters used to select a particular visual effect applied by a tool. Examples of tools and parameters include paint brushes, line application tools, line weights, line lengths, curvatures, colors, an angle of twist to be applied to a line or a selection in a drawing object, and many others.

The drawing object library 420 also stores instructions corresponding to the various parameters and corresponding value ranges that are provided to users to generate and/or edit drawing objects. Selected values of these parameters are referenced, in some examples, by the parametric procedural model to generate drawing objects.

Instructions for applying and executing deformation handles are also stored in the drawing object library 420. Deformation handles can be applied to various locations on a drawing object and enable a user to change orientation, length, size, and shape of a portion of the drawing object to which the deformation handle is attached. Deformation handles are one way of providing a convenient user interface for the editing of a drawing object as an alternative to providing a plurality of user selectable parameters, each of which must be empirically varied in combination with the other selectable parameters to create a particular visual effect.

In the example shown, the 2D design store 428 includes any of the non-transitory computer readable media described above as well as instructions for the receipt and storage of a user provided 2D design. As described above, the user provided 2D design can be a digitized version of a sketch drawn on paper or can be originally drawn within a drawing application. Regardless of the source of the 2D design, it can be transmitted to the drawing system 412 (e.g., through the network 408, as described above) and stored in the 2D design store for use by other elements of the drawing system 412, as described herein.

The separation module 432, in communication with each of the 2D design store 428 and the drawing object library 420, to analyze one or both of a 2D design received from user and one or more drawing objects. Once a 2D design has been received from the 2D design store 428 and/or the drawing object received from the drawing object library 420, the separation module 432 separates a perimeter outline and an interior from the design and/or 3D drawing object. The separated elements of the 2D design and/or the 3D drawing object are then stored in the separation module 432 for subsequent operations performed by the drawing system 412. The methods and tools used for the separation can be implemented using tools associated with feature vector and/or image processing systems.

The vector module 436 receives perimeter outlines and interiors from the separation module 432 and converts the received perimeter outline and interiors into vector representations. Both the identification of a perimeter outline and an interior of a design and the generation of vectors corresponding to the perimeter outline and the interior are accomplished using image analysis and feature vector generation schemes that can be embedded features of drawing applications or other image processing application.

The comparison module 440 receives vectors of both 2D designs and 3D drawing objects. As described above, the comparison module 440 executes equation 1 (or equations 2, 3) to determine the differences between vectors of the 2D design and the 3D drawing objects. As described above, the comparison module 440 can determine a difference between 2D design and 3D drawing object vectors of perimeter outlines, of the interiors, or both. The comparison module 440 uses the comparison described above to generate at least one of the similarity metric M, $M_1$, and $M_2$. Based on identifying a minimum value of one or more of the similarity metric M, $M_1$, and $M_2$, the comparison module 440 selects the 3D drawing object corresponding to the minimum similarity metric. As already described in FIG. 1, the selected 3D drawing object is used to present a drawing object to a user. In some embodiments, the drawing object presented to the user can be either or both of the 3D drawing object itself or its 2D projection used by the system to compare the 2D design to the 3D drawing objects using a same number of spatial dimensions.

The web server 444 links the drawing system 412 to the user device 404 via the network 408. The web server 444 serves web pages, as well as other web-related content, such as JAVA®, FLASH®, XML and so forth. The web server 444 may provide the functionality of receiving source image files from a user device 404, receiving edits to target image files from the user device 404, and providing data to be rendered as an image corresponding to the target image file on the user device 404. Additionally, the web server 444 may provide application programming interface (API) functionality to send data directly to native client device operating systems, such as IOS®, ANDROID™, WEBOS® or RIM. The web server 444 also provides API functionality for exchanging data with the user device 404.

The drawing system 412 also includes at least one processor 448 for executing computer-readable and computer-executable instructions or software stored in the memory 416 or any of the modules of the drawing system 412. Virtualization may be employed so that infrastructure and resources in the drawing system 412 may be shared dynamically. For example, a virtual machine may be provided to handle a process running on multiple processors so that the process appears to be using only one computing resource rather than multiple computing resources. Multiple virtual machines may also be used with the processor 448.

Further Example Embodiments

In one example embodiment, the present disclosure includes a method for automatically generating a drawing object corresponding to a two dimensional (2D) design. The method includes receiving drawing data representing the 2D design, generating, based on the drawing data, at least one design vector corresponding to the 2D design, generating a three dimensional (3D) drawing object and projecting the 3D drawing object into two dimensions, generating at least one model vector for the two dimensional projection of the 3D drawing object, generating at least one similarity metric quantifying a difference between the at least one design vector of the 2D design and each corresponding at least one model vector of the two dimensional projection of the 3D drawing object, and selecting a 3D drawing object based on a minimum value of the at least one similarity metric. In one embodiment the 2D design is a hand-drawn sketch. In one embodiment, generating the at least one design vector includes separating the 2D design into a design perimeter outline and a design interior and generating a first design vector corresponding to the perimeter outline and a second design vector corresponding to the design interior. In one embodiment, the generating at least one design vector includes separating the two dimensional projection of the 3D drawing object into a perimeter outline and an interior and generating a first model vector corresponding to the perimeter outline and a second model vector corresponding to the interior. In one embodiment, the selecting the 3D drawing object based on a minimum value of the at least one similarity metric includes minimizing a sum of (1) a first difference between a first design vector corresponding to a perimeter outline and a first model vector corresponding to a perimeter outline of a 2D projection of a 3D drawing object and (2) a second difference between a second design vector corresponding to a design interior and a second model vector corresponding to an interior of the 2D projection of the 3D drawing object. In one embodiment, the selecting the 3D drawing object based on a minimum value of the at least one similarity metric further includes modifying the first difference with a first weight factor. In one embodiment, the method further includes applying at least one deformation handle to the selected 3D drawing object, the applying including generating a new set of 3D drawing objects by changing parameter values associated with the selected 3D drawing object and rendering each 3D drawing of the new set using the changed parameter values, identifying a plurality of sample points on each 3D drawing object of the new set, determining a change in position for each sample point of each 3D drawing object of the new set relative to the selected 3D drawing object, identifying a sub-set of sample points having a change in position relative to a change in parameter value above a threshold, and applying a deformation handle to at least one sample point of the sub-set.

In another example embodiment, computer program product wherein the computer program product is stored on at least one non-transitory computer-readable medium that includes instructions that when executed by one or more processors cause a process to be carried out, the process including various elements of the previously described method example embodiment.

In another example embodiment, a system is described for automatically generating a drawing object. The system includes a memory of a non-transitory computer-readable medium receiving configured for storing at least drawing data representing the 2D design and storing instructions for a parametric procedural engine for generating a three dimensional (3D) drawing object and projecting the 3D drawing object into two dimensions. The system also includes a vector module configured for generating based on the drawing data, at least one design vector corresponding to the 2D design and generating at least one model vector for the two dimensional projection of the 3D drawing object. The system also includes a comparison module configured for generating at least one similarity metric quantifying a difference between the at least one design vector of the 2D design and each corresponding at least one model vector of the two dimensional projection of the 3D drawing object and selecting a 3D drawing object based on a minimum value of the at least one similarity metric. In one embodiment, the memory of the system is further configured for storing a hand-drawn sketch corresponding to the 2D design. In one embodiment, the vector module of the system is further configured for separating the 2D design into a design perimeter outline and a design interior and generating a first design vector corresponding to the perimeter outline and a second design vector corresponding to the design interior. In one embodiment, the comparison module of the system is further configured for selecting the 3D drawing object by minimizing a sum of (1) a first difference between a first design vector corresponding to a perimeter outline and a first model vector corresponding to a perimeter outline of a 2D projection of a 3D drawing object and (2) a second difference between a second design vector corresponding to a design interior and a second model vector corresponding to an interior of the 2D projection of the 3D drawing object.

Further Considerations

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

What is claimed is:

1. A method for automatically generating a drawing object corresponding to a two dimensional (2D) design, the method comprising:
   receiving drawing data representing the 2D design;
   generating, based on the drawing data, a perimeter design vector corresponding to a perimeter outline portion for the 2D design, and an interior design vector corresponding to a design interior portion for the 2D design;
   generating a three dimensional (3D) drawing object and a two dimensional projection of the 3D drawing object;
   generating a perimeter model vector corresponding to a perimeter outline portion for the two dimensional projection and an interior model vector corresponding to a model interior portion for the two dimensional projection;
   generating a similarity metric quantifying a sum of (1) a first difference between the perimeter design vector corresponding to the perimeter outline portion for the 2D design and the perimeter model vector corresponding to the perimeter outline portion for the two dimensional projection of the 3D drawing object and (2) a second difference between the interior design vector corresponding to the design interior portion for the 2D design and the interior model vector corresponding to the model interior portion of the 2D projection of the 3D drawing object; and
   selecting the 3D drawing object based the similarity metric.

2. The method of claim 1, wherein the 2D design is a hand-drawn sketch.

3. The method of claim 1, further comprising separating the 2D design into the perimeter outline portion for the 2D design and the design interior portion for the 2D design.

4. The method of claim 1, further comprising separating the two dimensional projection of the 3D drawing object into the perimeter outline portion for the two dimensional projection and the model interior portion for the two dimensional projection.

5. The method of claim 1, wherein generating the similarity metric further comprises minimizing the sum.

6. The method of claim 5, further comprising modifying the first difference with a weight factor.

7. The method of claim 5, further comprising modifying the second difference with a weight factor.

8. The method of claim 1, further comprising applying at least one deformation handle to the selected 3D drawing object by:
   generating a new 3D drawing object by changing parameter values associated with the selected 3D drawing object;
   identifying a plurality of sample points on the new 3D drawing object;
   determining a change in position for each sample point;
   identifying a sub-set of sample points having a change in position above a threshold; and
   applying a deformation handle to at least one sample point of the sub-set.

9. A computer program product that is stored on at least one non-transitory computer-readable medium and that includes instructions that when executed by one or more processors cause a process to be carried out, the process comprising:
   receiving drawing data representing a two dimensional (2D) design;
   separating the 2D design into a perimeter outline portion and a design interior portion;
   generating, based on the drawing data, a perimeter design vector $P_d$ corresponding to the perimeter outline portion of the 2D design;
   generating, based on the drawing data, an interior design vector $I_d$ corresponding to the design interior portion of the 2D design;
   generating a first three dimensional (3D) drawing object that resembles the perimeter outline portion of the 2D design;
   separating the first 3D drawing object into a perimeter outline portion and a model interior portion;

generating a first perimeter model vector $P_{m1}$ corresponding to the perimeter outline portion of the first 3D drawing object;

generating a first interior model vector $I_{d1}$ corresponding to the model interior portion of the first 3D drawing object;

generating a second 3D drawing object that resembles the design interior portion of the 2D design;

separating the second 3D drawing object into a perimeter outline portion and a model interior portion;

generating a second perimeter model vector $P_{m2}$ corresponding to the perimeter outline portion of the second 3D drawing object;

generating a second interior model vector $I_{m2}$ corresponding to the model interior portion of the second 3D drawing object;

determining a similarity metric that is proportional to a sum of (a) a first difference between the perimeter design vector $P_d$ and one of the first and second perimeter model vectors ($P_{m1}$, $P_{m1}$) and (b) a second difference between the interior design vector $I_d$ and one of the first and second interior model vectors ($I_{m1}$, $I_{m2}$); and selecting one of the first and second 3D drawing objects based on the similarity metric.

10. The computer program product of claim 9, wherein the 2D design is a hand-drawn sketch.

11. The computer program product of claim 9, wherein separating the 2D design into the perimeter outline portion and the design interior portion further comprises:

identifying a subset of outermost elements of the 2D design and designating the subset as comprising the perimeter outline portion of the 2D design; and designating elements of the 2D design that are not in the subset as comprising the design interior portion.

12. The computer program product of claim 9, wherein separating the first 3D drawing object into the perimeter outline portion and the model interior portion further comprises:

identifying a subset of outermost elements of the first 3D drawing object and designating the subset as comprising the perimeter outline portion of the first 3D drawing object; and designating elements of the first 3D drawing object that are not in the subset as comprising the model interior portion.

13. The computer program product of claim 9, wherein the perimeter outline portion of the first 3D drawing object is a perimeter outline portion of a 2D projection of the first 3D drawing object.

14. The computer program product of claim 9, the process further comprising modifying the first difference with a weight factor.

15. The computer program product of claim 9, the process further comprising modifying the second difference with a weight factor.

16. The computer program product of claim 9, the process further comprising applying at least one deformation handle to the selected 3D drawing object by:

generating a new 3D drawing object by changing parameter values associated with the selected 3D drawing object;

identifying a plurality of sample points on the new 3D drawing object;

determining a change in position for each sample point;

identifying a sub-set of sample points having a change in position above a threshold; and applying a deformation handle to at least one sample point of the sub-set.

17. A system for automatically generating a drawing object, the system comprising a non-transitory computer-readable medium having stored therein:

drawing data representing a two dimensional (2D) design;

a vector module configured to generate a design vector corresponding to the 2D design and a model vector for each of a plurality of three dimensional (3D) drawing objects, wherein each of the 3D drawing objects is associated with a corresponding 2D projection thereof;

a comparison module configured to (a) generate a plurality of similarity metrics, each quantifying a difference between the design vector one of the model vectors, and (b) select a particular 3D drawing object based on a minimum value of its similarity metric; and instructions, that when executed cause:

a new 3D drawing object to be generated as a result of changing parameter values associated with the particular 3D drawing object;

a plurality of sample points on the new 3D drawing object to be identified;

a change in position for at least a portion of the sample points to be determined;

a sub-set of sample points having a change in position above a threshold to be identified; and a deformation handle to be applied to at least one of the sample points in the sub-set.

18. The system of claim 17, wherein the 2D design is a hand-drawn sketch.

19. The system of claim 17, wherein the vector module is further configured to separate the 2D design into a design perimeter outline and a design interior, and to generate a first design vector corresponding to the design perimeter outline and a second design vector corresponding to the design interior.

20. The system of claim 17, wherein the comparison module is further configured to select the particular 3D drawing object by: minimizing a sum of (1) a first difference between a first design vector corresponding to a perimeter outline portion for the 2D design and a first model vector corresponding to a perimeter outline portion of the 2D projection of the particular 3D drawing object and (2) a second difference between a second design vector corresponding to a design interior portion for the 2D design and a second model vector corresponding to a model interior portion of the 2D projection of the particular 3D drawing object.

21. A method for automatically generating a drawing object corresponding to a two-dimensional (2D) design, the method comprising:

receiving drawing data representing the 2D design;

generating a design vector corresponding to the 2D design and a model vector for each of a plurality of three dimensional (3D) drawing objects, wherein each of the 3D drawing objects is associated with a corresponding 2D projection thereof;

generating a plurality of similarity metrics, each quantifying a difference between the design vector and one of the model vectors;

selecting a particular 3D drawing object based on a minimum value of its similarity metric;

generating a new 3D drawing object as a result of changing parameter values associated with the particular 3D drawing object;

identifying a plurality of sample points on the new 3D drawing object;

determining a change in position for at least a portion of the sample points;

identifying a sub-set of sample points having a change in position above a threshold; and applying a deformation handle to at least one sample point in the sub-set.

22. The method of claim 21, further comprising selecting the particular 3D drawing object by: minimizing a sum of (1) a first difference between a first design vector corresponding to a perimeter outline portion for the 2D design and a first model vector corresponding to a perimeter outline portion of the 2D projection of the particular 3D drawing object and (2) a second difference between a second design vector corresponding to a design interior portion for the 2D design and a second model vector corresponding to a model interior portion of the 2D projection of the particular 3D drawing object.

23. The method of claim 21, further comprising:

separating the 2D design into a design perimeter outline and a design interior; and generating a first design vector corresponding to the design perimeter outline and a second design vector corresponding to the design interior.

24. A computer program product that is stored on at least one non-transitory computer-readable medium and that includes instructions that when executed by one or more processors cause a process for automatically generating a drawing object corresponding to a two-dimensional (2D) design to be carried out, the process comprising:

receiving drawing data representing the 2D design;

generating a design vector corresponding to the 2D design and a model vector for each of a plurality of three dimensional (3D) drawing objects, wherein each of the 3D drawing objects is associated with a corresponding 2D projection thereof;

generating a plurality of similarity metrics, each quantifying a difference between the design vector and one of the model vectors;

selecting a particular 3D drawing object based on a minimum value of its similarity metric;

generating a new 3D drawing object as a result of changing parameter values associated with the particular 3D drawing object;

identifying a plurality of sample points on the new 3D drawing object;

determining a change in position for at least a portion of the sample points;

identifying a sub-set of sample points having a change in position above a threshold; and applying a deformation handle to at least one sample point in the sub-set.

25. The computer program product of claim 24, wherein the 2D design is a hand-drawn sketch.

26. The computer program product of claim 24, wherein the process further comprises:

separating the 2D design into a design perimeter outline and a design interior; and generating a first design vector corresponding to the design perimeter outline and a second design vector corresponding to the design interior.

\* \* \* \* \*

UNITED STATES PATENT AND TRADEMARK OFFICE
CERTIFICATE OF CORRECTION

PATENT NO. : 10,062,215 B2
APPLICATION NO. : 15/014386
DATED : August 28, 2018
INVENTOR(S) : Radomir Mech, Mehmet Ersin Yumer and Haibin Huang It is certified that error appears in the above-identified patent and that said Letters Patent is hereby corrected as shown below:

In the Claims

Column 18, Line 14, Claim 17, please replace "vector one" with --vector and one--.

Signed and Sealed this
Twentieth Day of November, 2018

Andrei Iancu
*Director of the United States Patent and Trademark Office*